United States Patent
Sela et al.

(10) Patent No.: US 8,751,802 B2
(45) Date of Patent: Jun. 10, 2014

(54) STORAGE DEVICE AND METHOD AND FOR STORAGE DEVICE STATE RECOVERY

(75) Inventors: Rotem Sela, Haifa (IL); Avraham Shmuel, Cupertino, CA (US)

(73) Assignee: SanDisk IL Ltd., Kfar Saba (IL)

( * ) Notice: Subject to any disclaimer, the term of this patent is extended or adjusted under 35 U.S.C. 154(b) by 674 days.

(21) Appl. No.: 12/827,978

(22) Filed: Jun. 30, 2010

(65) Prior Publication Data

US 2012/0005526 A1 Jan. 5, 2012

(51) Int. Cl.
*G06F 11/08* (2006.01)
*H04L 9/32* (2006.01)

(52) U.S. Cl.
USPC ........... 713/168; 713/161; 713/169; 713/170; 726/2; 726/4; 726/5; 726/6

(58) Field of Classification Search
USPC ............ 714/15; 713/161, 168–176, 181, 187; 726/2–10
See application file for complete search history.

(56) References Cited

U.S. PATENT DOCUMENTS

| | | | |
|---|---|---|---|
| 6,493,824 B1 | 12/2002 | Novoa et al. | |
| 7,103,909 B1* | 9/2006 | Kondo et al. | 726/2 |
| 7,137,003 B2 | 11/2006 | Krishnan et al. | |
| 7,353,329 B2* | 4/2008 | Ellis et al. | 711/106 |
| 7,454,614 B2* | 11/2008 | Kroeger et al. | 713/168 |
| 7,743,241 B1* | 6/2010 | Moore | 713/2 |
| 7,941,832 B2* | 5/2011 | Tsutsui et al. | 726/5 |
| 2005/0033959 A1 | 2/2005 | Zheng et al. | |
| 2006/0027644 A1* | 2/2006 | Takashi et al. | 235/380 |
| 2007/0192597 A1 | 8/2007 | Bade et al. | |
| 2008/0010455 A1 | 1/2008 | Holtzman et al. | |
| 2008/0082826 A1 | 4/2008 | Ahlquist | |
| 2008/0162763 A1* | 7/2008 | Bney-Moshe | 710/263 |
| 2008/0320253 A1 | 12/2008 | Tomlin et al. | |
| 2009/0198809 A1* | 8/2009 | Goto et al. | 709/223 |

OTHER PUBLICATIONS

Hubbers et al., "Implementing a Formally Verifiable Security Protocol in Java Card", Nijmegen Institute for Information and Computing Sciences, University of Nijmegen, Nijmegen, The Netherlands, 2004, pp. 1-15.
Mostowski, W., "Formal Development of Safe and Secure Java Card Applets", Department of Computer Science and Engineering, Chalmers University of Technology and Göteborg University, Feb. 2005, pp. i-151.
Oestreicher, M., "Transactions in Java Card," IBM Zurich Research Laboratory, 15th Annual Computer Security Applications Conference (ACSAC), Rueschlikon, Switzerland,1999, 8 pages.
International Search Report and Written Opinion for PCT/US2011/036946, dated Aug. 5, 2011, 8 pages.

* cited by examiner

*Primary Examiner* — Venkat Perungavoor
*Assistant Examiner* — Amir Mehrmanesh
(74) *Attorney, Agent, or Firm* — Brinks Gilson & Lione

(57) ABSTRACT

A storage device and method for storage device state recovery are provided. In one embodiment, a storage device commences an authentication process to authenticate a host device. The authentication process comprises a plurality of phases, and the storage device stores the state of the authentication process, wherein the state indicates the phase(s) of the authentication process that have been successfully completed. After a power loss, the storage device retrieves the state of the authentication process and resumes an operation with the host device without re-performing the phase(s) of the authentication process that have been completed.

24 Claims, 4 Drawing Sheets

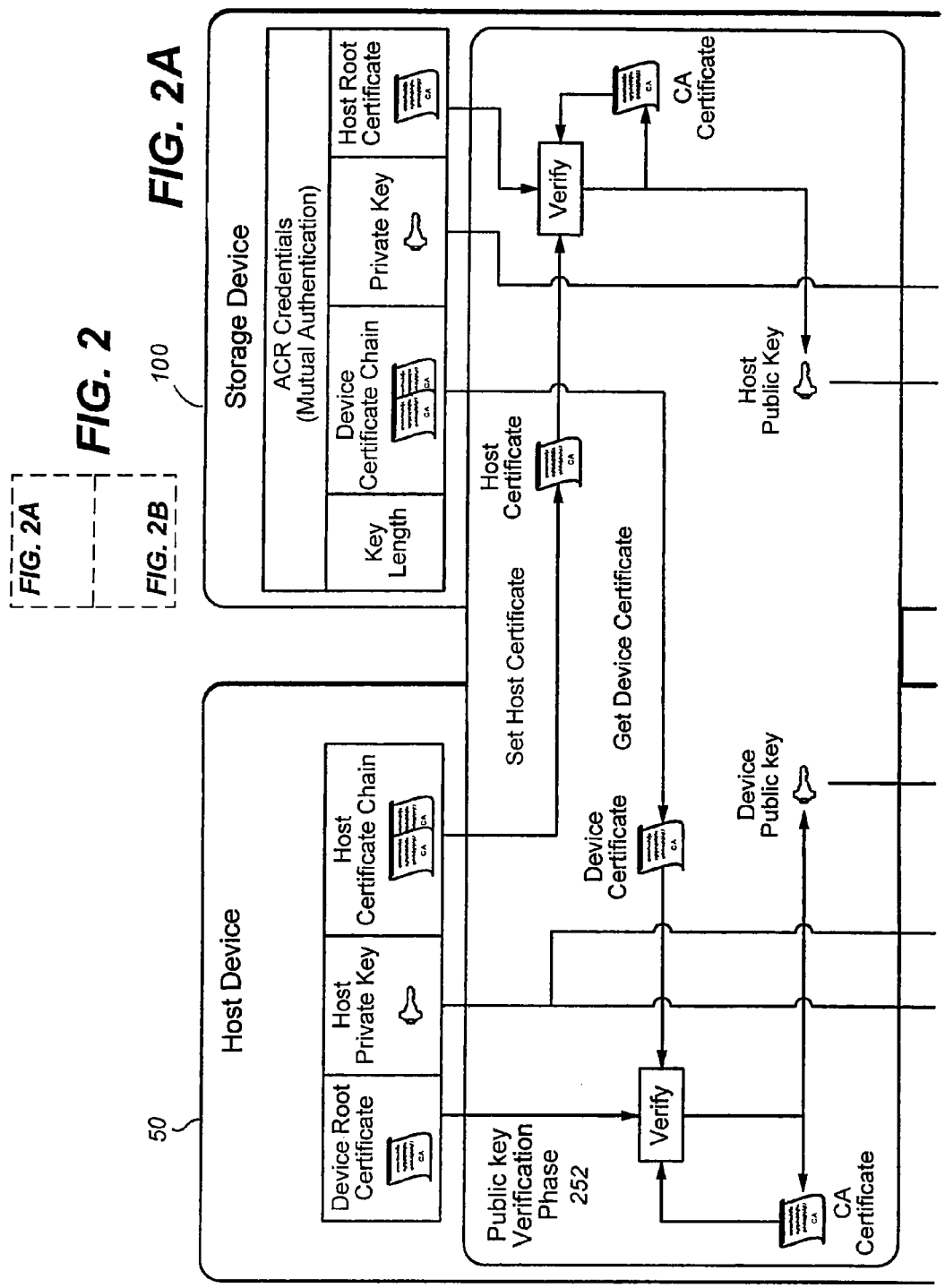

STORAGE DEVICE AND METHOD AND FOR STORAGE DEVICE STATE RECOVERY

BACKGROUND

Storage devices, such as SD cards, are being utilized not only as stateless memory devices but also as a platform for supporting complex transactions during a secure session after a mutual authentication process authenticates the storage device with a host device, and vice versa. A sudden power down during a complex transaction requires the storage device to transition back to its state before the power loss. That can require, for example, fully re-authenticating the storage device with the host device using an RSA login authentication process. Such re-authentication is time consuming and degrades the overall system performance, especially when it occurs in the middle of a host-storage device transaction. For example, after a storage device powers up, the storage device can be initialized at an operational state which has no prior knowledge (e.g., operational knowledge) from its previous power-up state. In this way, an authentication procedure must be performed by both the storage device and the host device each time a power down occurs in order to re-commence a secured channel between the storage device and the host device. For example, in the case of an RSA log-in authentication process, a full authentication process applied between the storage device and the host device after each power loss includes performing each of the following three phases: a public key verification phase, a private key verification phase, and a session key agreement phase. This is a time-consuming process that can degrade the overall system performance.

SUMMARY

Embodiments of the present invention are defined by the claims, and nothing in this section should be taken as a limitation on those claims.

By way of introduction, the embodiments described below generally relate to a storage device and method for storage device state recovery. In one embodiment, a storage device commences an authentication process to authenticate a host device. The authentication process comprises a plurality of phases, and the storage device stores the state of the authentication process, wherein the state indicates the phase(s) of the authentication process that have been successfully completed. After a power loss, the storage device retrieves the state of the authentication process and resumes an operation with the host device without re-performing the phase(s) of the authentication process that have been completed.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

By way of introduction, the following embodiments provide a storage device and method for storage device state recovery. As mentioned in the background section above, a sudden power down of a host device can require fully re-authenticating the storage device with the host device using a login authentication process, which can be time consuming and can degrade system performance. For example, in the case of an RSA log-in authentication process, a full authentication process applied between the storage device and the host device after each power loss includes performing each of the following three phases: a public key verification phase, a private key verification phase, and a session key agreement phase. The following embodiments provide a solution to this problem by storing a state of the authentication process in the storage device, wherein the state indicates the phase(s) of the authentication process that have been successfully completed. The state can be stored automatically or in response to a command from the host device and is preferably stored in a secure fashion in the storage device. If a power loss occurs, the memory device can retrieve the state of the authentication process (either automatically or in response from a recovery command from the host device) and resume an operation with the host device without re-performing the phase(s) of the authentication process that have been completed.

Figure 1:
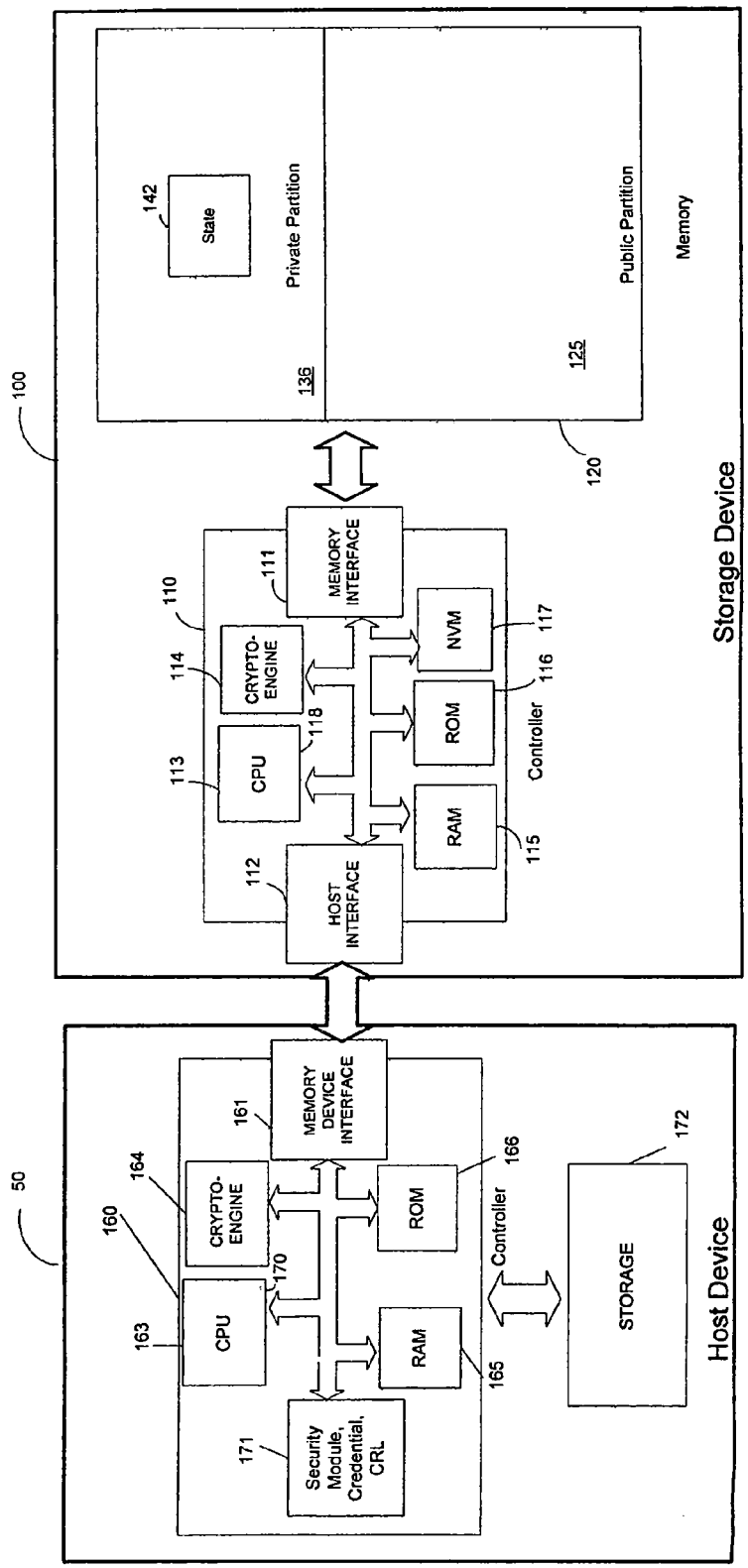
FIG. 1 is a block diagram of a host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. The host device 50 can take any suitable form, such as, but not limited to, a personal computer (PC), a mobile phone, a digital media player, a game device, a personal digital assistant (PDA), a kiosk, a set-top box, a TV system, a book reader, or any combination thereof. In this embodiment, the storage device 100 is a mass storage device that can take any suitable form, such as, but not limited to, a handheld, removable memory card, a universal serial bus (USB) device, a removable or non-removable hard drive, such as a solid-state drive, and an embedded memory (e.g., a secure module embedded in the host device 50).

As shown in FIG. 1, the storage device 100 comprises a controller 110 and a memory 120. The controller 110 comprises a memory interface 111 for interfacing with the memory 120 and a host interface 112 for interfacing with the host 50. In this embodiment, the controller 110 also comprises a central processing unit (CPU) 113, a hardware crypto-engine 114 operative to provide encryption and/or decryption operations, read access memory (RAM) 115, read only memory (ROM) 116 which can store firmware for the basic operations of the storage device 100, and a non-volatile memory (NVM) 117 which can store a device-specific key used for encryption/decryption operations. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91 SAM, Microchip PIC18F26K20, and Silicon Labs C8051F320.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. In this embodiment, the memory 120 comprises a public partition 125 that is managed by a file system on the host 50 and a private partition 135 that is internally managed by the controller 110. The private partition 135 can store the state 142 of the storage device 100 (as will be described below), as well as other data, including, but not limited to, content encryption keys (CEKs) and firmware (FW) code. The public partition 125 and the private partition 135 can be part of the same memory unit or can be different memory units. Preferably, the storage device 200 takes the form of a TrustedFlash™ storage device by SanDisk Corporation.

Turning now to the host 50, the host 50 comprises a controller 160 that has a storage device interface 161 for interfacing with the storage device 100. In this embodiment, the controller 160 also comprises a central processing unit (CPU) 163, a crypto-engine 164 operative to provide encryption and/or decryption operations, read access memory (RAM) 165, read only memory (ROM) 166, a security module 171, and storage 172. The storage device 100 and the host 150 communicate with each other via a storage device interface 161 and a host interface 112. For operations that involve the secure transfer of data, it is preferred that the crypto-engines 114, 164 in the storage device 100 and host 150 be used to mutually authenticate each other and provide a key exchange. After mutual authentication is complete, it is preferred that a session key be used to establish a secure channel for communication between the storage device 150 and host 100. The host 50 can contain other components (e.g., a display device, a speaker, a headphone jack, a video output connection, etc.), which are not shown in FIG. 1 to simplify the drawings.

Figure 2B:
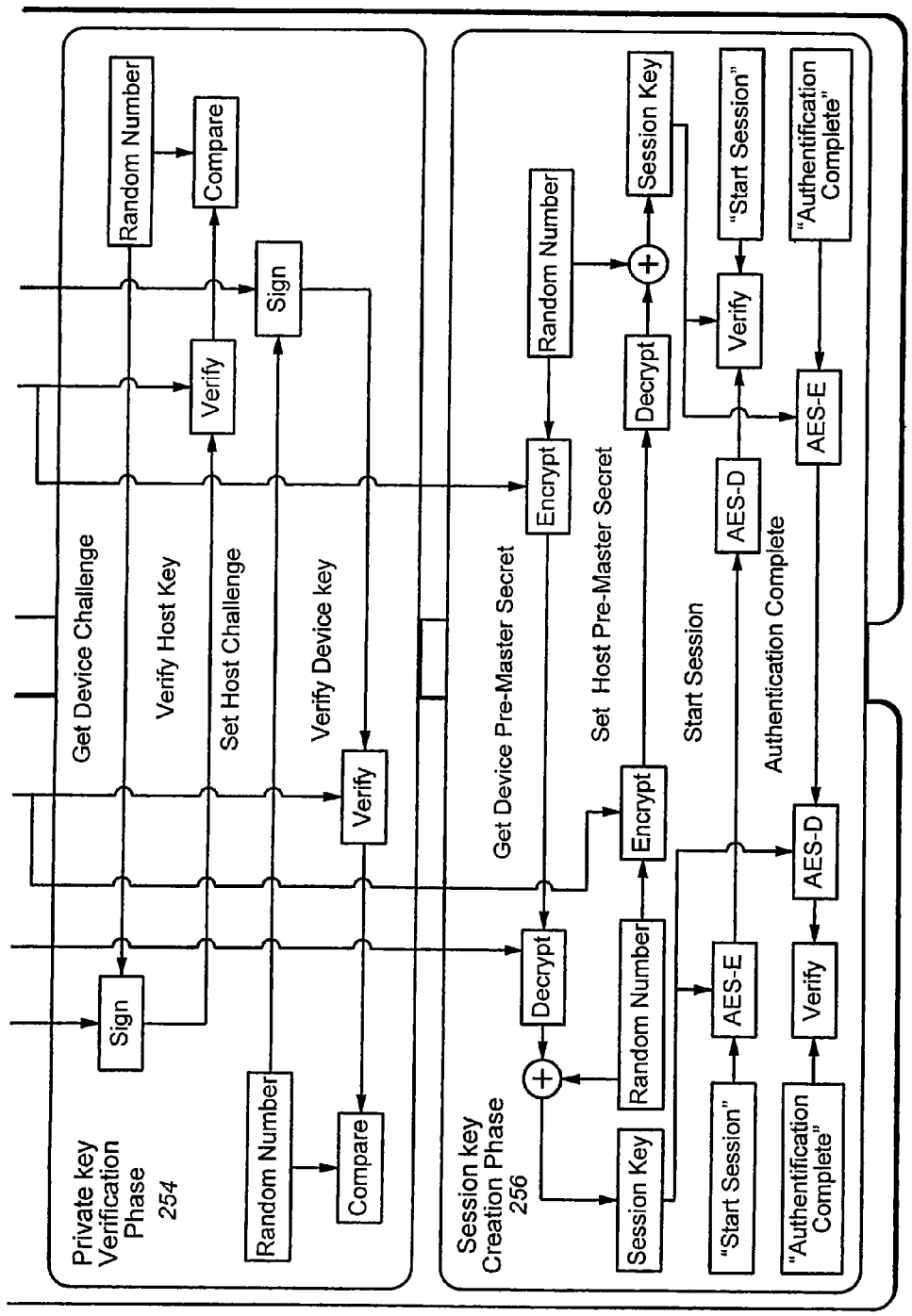
FIG. 2 is an illustration depicting mutual authentication of a host device and storage device of an embodiment.

Returning to the drawings, FIG. 2 is an illustration depicting mutual authentication of the host device 50 and the storage device 100. As shown in FIG. 2, this particular mutual authentication process comprises three phases: a public key verification phase (252), a private key verification phase (254), and a session key agreement phase (256). During the public key verification phase, the host device 50 and the storage device 100 each sends the other its certificate chain, so that the other can verify the genuineness of the certificate and of the public key using the root certificate authority public key located in the root certificate (in the storage device 100, this is present in an access control record). Where an intermediate certificate authority between the root certificate authority and the host device 50 or storage device 100 is involved, the intermediate certificate is used as well for the verification.

If the public key verification phase is successful, the private key verification phase is performed. During the private key verification phase, the host device 50 and the storage device 100 each generates a random number and sends it as a challenge to the other device. With respect to the storage device 100, the storage device 100 signs the host device's random number using the private key of the storage device 100 and sends the signed random number as the response to the challenge. The response is verified using the storage device's public key and compared with the random number. If the signature verification was successful, the challenge response is successful. The same process occurs with respect to the host device 50.

If the private key verification phase is successful, the session key agreement phase is performed. During the session key agreement phase, the random number is encrypted using the host device's public key. This random number is then the session key. The host device 50 can obtain the session key by using its private key to decrypt the encrypted number from the storage device 100. The session key can also be an XOR operation between the two challenges. The same process occurs on the host device 50 side. With the session key, secure communication between the host device 50 and the storage device 100 can be initiated.

Figure 3:
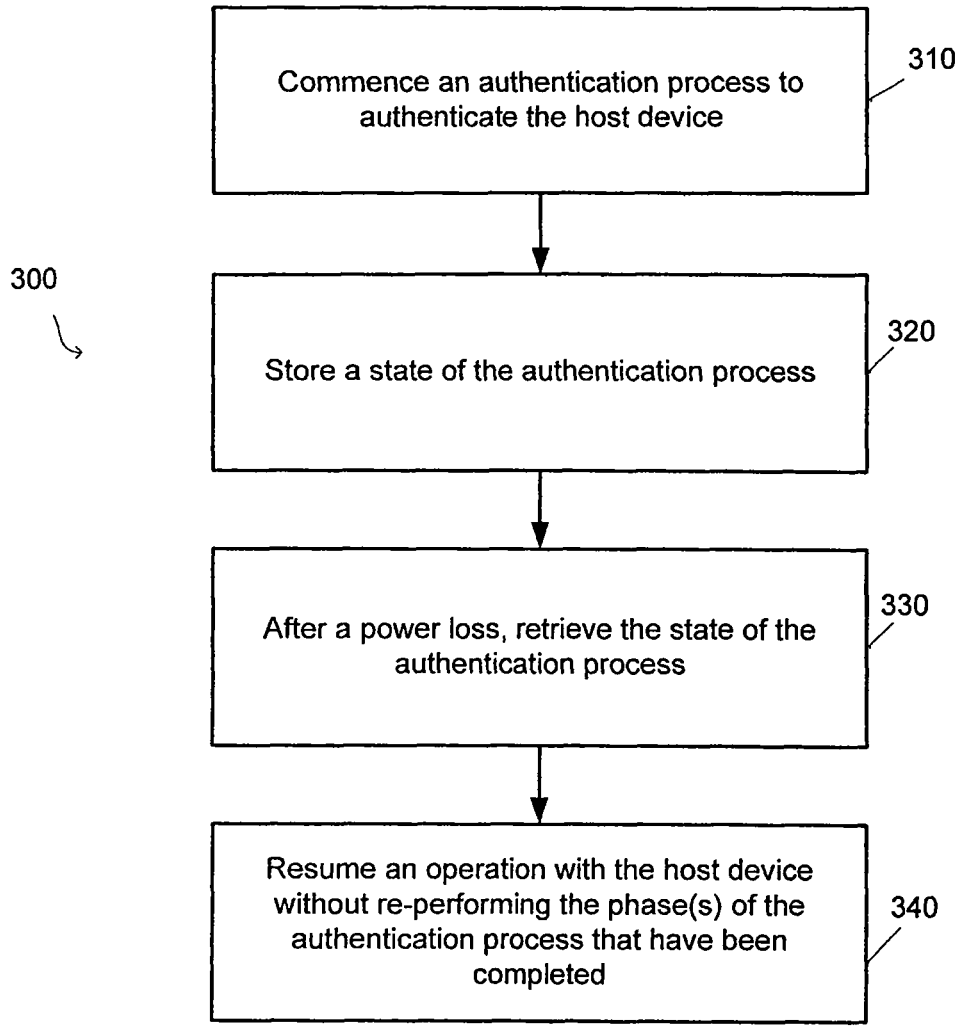
FIG. 3 is a flow chart of a method of an embodiment for performing storage device state recovery.

Performing these three phases can be time-consuming. As mentioned in the background section above, a sudden power down can require fully re-authenticating the storage device 100 with the host device 50 by re-performing all three authentication phases—even those that were successfully completed before the power down. This can degrade overall system performance. To overcome this problem, the method shown in the flowchart 300 of FIG. 3 can be performed. As shown in FIG. 3, the storage device 100 commences an authentication process to authenticate the host device 100 (act 310). Next, the storage device 100 stores a state of the authentication process (act 320). The state of the authentication process indicates the phase(s) of the authentication process that have been successfully completed. (The authentication process in the above example comprised three phases, but other authentication processes can have fewer or more phases.) For security reasons, it may be preferred to store the state in a location in the storage device 100 that is accessible by the controller 110 of the storage device 100 but not by the host device 50 (e.g., in the private partition 136 of the memory 120). Additionally, the state can be stored in an encrypted form and/or be integrity protected. The state can be stored automatically by the storage device 100 (e.g., upon initialization/upon authentication/once a secure session with the host device 50 is commenced, etc.) or in response to a specific command (e.g., a suspend message) from the host device 50.

If a power loss occurs, the storage device 100 can retrieve the state of the authentication process (act 330). For example, the state can be retrieved in an autonomous manner by the storage device 100 (i.e., without the host device 50 communicating with the storage device 100) by following a pre-defined set of rules that are stored on the storage device 100. Alternatively, the state can be retrieved in response to receiving a recovery command from the host device 50. As it is possible that the storage device 100 can be removed from the host device 50 after power loss and then inserted into a different host device that may or may not have previously authenticated to the storage device 100, it is preferred that the state be retrieved and used in response to receiving a recovery command, rather than be retrieved and used in an autonomous manner. This way, the storage device 100 can be assured that the host device present at power up is a host device that previously authenticated itself to the storage device 100—whether it be the host device that was present at power loss or a different host device. This allows the storage device 100 to distinguish between or allow different host devices.

In one embodiment, the recovery command comprises a secure token such as a function of a session key or a session ID. To add uniqueness, the secure token can also be a function of a value of a counter, so that a different recovery command is issued after each power down (e.g., for each re-commenced session with the storage device 100). As an example, a secure token can be generated using a SHA-1 function, as follows: SHA-1(sessionkey+i||sessionID+i), where 'i' is the counter of how many successful recovery commands were sent. In this way, the secure token is unique to a pre-verified host-storage device environment and is updated with each recovery command, so that once the storage device 100 receives the secure token (via the recovery command), the secure token is no longer valid.

Since the particular host-storage device session key or the sessionID was stored in the storage device 100 in a previous logged-in session (i.e., before power down of the storage device 100), the storage device 100 is able to determine whether the recovery command received from the host device 50 is a 'valid' recovery command or not. If the storage device 100 receives an expected recovery command from the host device 50 (e.g., indicating that the host device 50 is a pre-authenticated entity), the storage device 100 can operate in "STATE A" (e.g., a "log-in state") by resuming an operation with the host device 100 (here, a secure session is re-commenced without re-performing the authentication process) (act 340). Accordingly, if the storage device 100 received an expected recovery command, it is set to retain the operational state present before the power down. However, if the storage device 100 gets an unexpected recovery command (e.g., indicating the host device 50 is not a pre-authenticated entity), the storage device 100 can recommence operation in "STATE B" (e.g., a "blocked state" that indicates a failure to log in). If the storage device 100 does not receive a recovery command, the storage device 100 can be operational in "STATE C" (e.g., a "default or log-off state"). Of course, the storage device 100 can be configured to use different or other logical states.

As can be seen from these examples, this embodiment addresses the problem discussed in the background section above by allowing the storage device 100 to resume an operation with the host device 50 after a power loss without requiring the host device 50 to re-authenticate itself to the storage device 100. That is, these embodiments provide a way for recommencing a session (e.g., after power down of the storage device 100) between pre-authenticated entities without requiring the host device 50 to re-authenticate itself to the storage device 100, and vice versa. Thus, in host device-storage device transactions, these embodiments can be implemented to enable the storage device 100 to retain its operational state without the need to perform a re-authentication process with the host device 50.

As discussed above, these embodiments can be used to recommence a session with the host device 100 without requiring the host device 50 to re-authenticate itself to the storage device 100. This assumes that the state stored in the storage device 100 indicates that all phases of the authentication process have been successfully completely. However, these embodiments can also be used to provide an abbreviated authentication process when some but not all of the phases of the authentication process have been successfully completely. For example, according to the RSA mutual authentication scheme described above, the storage device 100 stores the host device's public key after first phase of the authentication process. (As noted above, the storage device 100 preferably stores the host device's public key in a storage area that is accessible only to the storage device's controller 110 and is integrity protected from any change in public key data.) In this way, in case of a power loss to the memory device 100 at any time after phase one of the authentication process, the host device's public key remains available on the storage device 100. Accordingly, upon power up of the storage device 100, when the host device 50 re-initiates the log-in process with the storage device 100, assuming the storage device 100 verifies that the public key has not been tampered with, the storage device 100 can resume the authentication process at phase two, as if the power loss never occurred, instead of re-performing stage one. In this way, these embodiments provide a way to perform the mutual authentication process (e.g., phases one to three discussed above) once, e.g., upon initialization. For subsequent scenarios that occur during a host-storage device session (e.g., upon power down of the host device 50), a shorted authentication process is enough for assuring a secured session. This shortened authentication process can be tied to a set of rules (e.g., based on time constraints, date constraints, valid session constraints, etc.) to ensure that a shortened authentication process is not applied automatically upon every power fail.

There are several advantages associated with these embodiments. First, there is no need to perform a complete log-in authentication process in order to re-commence a pre-verified host-storage device secure session, which saves time and overcomes the problems discussed in the background section above. Also, since the host device preferably cannot send the recovery command unless it was in a log-in state ("STATE A"), the recovery command preferably cannot be recorded by an adversary for later use by an unauthorized host device. Additionally, these embodiments reduce the time at which the mutual authentication process is applied between host device and the storage device and allows the host application that performs the authentication process to be less sensitive to (i.e., execute less operations due to) power loss caused by, for example, the storage device driver.

These embodiments also provide advantages over environments in which the host device may send operational information to the storage device after a power loss, as the operational information that the host device has about the storage device might be wrong. Consider, for example, the situation in which the storage device was mounted to a different host device or the situation in which the same host device was connected to a different storage device at any time between the first and second log-in phases. In such a situation, the storage device preferably challenges the host device and verifies whether the private key being received from the host device is valid. In case such private key verification fails, the storage device can abort the shortened authentication process, and secured data would not be exposed.

These embodiments also provide particular advantage in situations where authentication by one entity provides access to a flash address range to other entities. As noted above, for the storage device to enter "logged-in" state, the host device and the storage device first go through a long authentication process. Only then is the host device authorized to perform operations on the storage device. In some environments, at "logged-in" state, the host device is authorized to access a flash address range using standard read and write commands. In case of a power loss of the storage device, access to this range is limited only to the host device which was at a logged-in state to the account with authorization to the range. Sending the recovery command described above saves the log-in sequence and operates the storage device to bypass the authentication process with the host device while still making it impossible to clone and re-send the recovery command from a different host.

While the examples discussed above related to the state of the authentication process, any type of operational information can be stored for later recovery. Accordingly, these embodiments can be used to control the operation of a storage device after power down occurs. The operation control can include determining the operational state (recovery state) of the storage device and operating the storage device accordingly. The recovery state can be the last operational state the storage was operating in before power down, or it can be "logged-in" state (e.g., after host-storage device authentication), "logged-off" state (e.g., before authentication), or any other operational state known to the device, or a blocked state (non-responding). The recovery state of the storage device is typically determined by the storage device itself based on operational information that was kept on the storage device at an earlier logged-in state (i.e., before power down of the storage device).

It should also be noted that the shortened authentication process discussed above can be an optional process, and the storage device need not be configured to provide the above-described functionally in situations where different (e.g., higher) security levels are required by the system designer (for example, in cases where an entity's certificate is revoked). Also, while the above embodiments have been described in relation to using a shortened authentication process on the storage device side, these embodiments can also be used on the host device side.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for storage device recovery, the method comprising:
   performing the following in a storage device:
      commencing an authentication process to authenticate a host device, wherein the authentication process comprises a plurality of phases;
      storing a state of the authentication process, wherein the state indicates the phase(s) of the authentication process that have been successfully completed;
      after a power loss, receiving a recovery command from the host device;
      determining if the recovery command indicates that the host device is a pre-authenticated entity;
      if the storage device determines that the recovery command indicates that the host device is a pre-authenticated entity:
         retrieving the state of the authentication process; and
         resuming an operation with the host device without re-performing the phase(s) of the authentication process that have been completed; and
      if the storage device determines that the recovery command does not indicate that the host device is a pre-authenticated entity, operating in a blocked state that indicates a failure to log in.

2. The method of claim 1, wherein when the state indicates that all phases of the authentication process have been successfully completed, the operation with the host device resumes without requiring the host device to re-authenticate itself to the storage device.

3. The method of claim 1, wherein the state is stored in a location in the storage device that is accessible by a controller of the storage device but not by the host device.

4. The method of claim 1, wherein the state is stored automatically by the storage device.

5. The method of claim 1, wherein the state is stored in response to a command from the host device.

6. The method of claim 1 further comprising operating in a logged-off state if the recovery command is not received.

7. The method of claim 1, wherein the recovery command comprises a secure token.

8. The method of claim 7, wherein the secure token comprises a function of a session key.

9. The method of claim 8, wherein the secure token is also a function of a value of a counter.

10. The method of claim 7, wherein the secure token comprises a function of a session ID.

11. The method of claim 10, wherein the secure token is also a function of a value of a counter.

12. The method of claim 1, wherein the recovery command is received from a different, but previously-authenticated, host device.

13. A storage device comprising:
   an interface configured to communicate with a host device;
   a memory; and
   a controller in communication with the interface and the memory, wherein the controller is configured to:
      commence an authentication process to authenticate a host device, wherein the authentication process comprises a plurality of phases;
      store a state of the authentication process, wherein the state indicates the phase(s) of the authentication process that have been successfully completed;
      after a power loss, receive a recovery command from the host device;
      determine if the recovery command indicates that the host device is a pre-authenticated entity;
      if the storage device determines that the recovery command indicates that the host device is a pre-authenticated entity:
         retrieve the state of the authentication process; and
         resume an operation with the host device without re-performing the phase(s) of the authentication process that have been completed; and
      if the storage device determines that the recovery command does not indicate that the host device is a pre-authenticated entity, operate in a blocked state that indicates a failure to log in.

14. The storage device of claim 13, wherein when the state indicates that all phases of the authentication process have been successfully completed, the operation with the host device resumes without requiring the host device to re-authenticate itself to the storage device.

15. The storage device of claim 13, wherein the state is stored in a location in the memory that is accessible by the controller of the storage device but not by the host device.

16. The storage device of claim 13, wherein the state is stored automatically by the controller.

17. The storage device of claim 13, wherein the state is stored in response to a command from the host device.

18. The storage device of claim 13, wherein the controller is configured to operate in a logged-off state if the recovery command is not received.

19. The storage device of claim 13, wherein the recovery command comprises a secure token.

20. The storage device of claim 19, wherein the secure token comprises a function of a session key.

21. The storage device of claim 20, wherein the secure token is also a function of a value of a counter.

22. The storage device of claim 19, wherein the secure token comprises a function of a session ID.

23. The storage device of claim 22, wherein the secure token is also a function of a value of a counter.

24. The storage device of claim 13, wherein the recovery command is received from a different, but previously-authenticated, host device.

* * * * *